(12) United States Patent
Koh (10) Patent No.: US 12,472,913 B2
(45) Date of Patent: Nov. 18, 2025

(54) ANTI-COLLISION DEVICE AND ANTI-COLLISION METHOD FOR VEHICLE USING ELECTROMECHANICAL BRAKE

(71) Applicants: Hyundai Motor Company, Seoul (KR); Kia Corporation, Seoul (KR)

(72) Inventor: Sang Bum Koh, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 130 days.

(21) Appl. No.: 18/388,990

(22) Filed: Nov. 13, 2023

(65) Prior Publication Data

US 2025/0050844 A1 Feb. 13, 2025

(30) Foreign Application Priority Data

Aug. 9, 2023 (KR) ........................ 10-2023-0104131

(51) Int. Cl.
| | |
|---|---|
| *B60T 7/22* | (2006.01) |
| *B60Q 1/44* | (2006.01) |
| *B60Q 1/46* | (2006.01) |
| *B60Q 5/00* | (2006.01) |
| *B60Q 9/00* | (2006.01) |

(Continued)

(52) U.S. Cl.
CPC ................. *B60T 7/22* (2013.01); *B60Q 1/44* (2013.01); *B60Q 1/46* (2013.01); *B60Q 5/006* (2013.01); *B60Q 9/008* (2013.01); *B60T 8/17* (2013.01); *B60T 8/171* (2013.01); *B60T 8/58* (2013.01); *B60T 8/72* (2013.01); *B60T 13/746* (2013.01); *B60T 17/22* (2013.01); *G08G 1/16* (2013.01); *B60T 2201/022* (2013.01); *B60T 2210/32* (2013.01); *B60T 2240/00* (2013.01); *B60T 2250/00* (2013.01); *B60Y 2400/81* (2013.01)

(58) Field of Classification Search
CPC ... B60T 7/22; B60T 8/17; B60T 8/171; B60T 8/58; B60T 8/72; B60T 13/746; B60T 17/22; B60T 2201/022; B60T 2210/32; B60T 2240/00; B60T 2250/00; B60Q 1/44; B60Q 1/46; B60Q 5/006; B60Q 9/008; G08G 1/16; B60Y 2400/81
See application file for complete search history.

(56) References Cited

U.S. PATENT DOCUMENTS

| 10,766,469 B2 * | 9/2020 | Takae ........................ B60T 7/12 |
| 2017/0015314 A1 * | 1/2017 | Tanase .................. B60W 30/09 |

(Continued)

FOREIGN PATENT DOCUMENTS

| CN | 108501944 A | * | 9/2018 | ............ B60W 30/02 |
| CN | 108715163 A | * | 10/2018 | ............ B60W 10/06 |

(Continued)

*Primary Examiner* — Phutthiwat Wongwian
*Assistant Examiner* — Susan E Scharpf
(74) *Attorney, Agent, or Firm* — Fox Rothschild LLP (57) ABSTRACT

An anti-collision device for a vehicle utilizes an electromechanical brake (EMB). The anti-collision device is operable when the vehicle is parked in neutral, and may include a distance detection device for detecting a distance from a structure outside the vehicle, an EMB braking device for generating braking force in the vehicle, and an anti-collision control device for operating the EMB braking device in one of at least two anti-collision modes based on the distance detected by the distance detection device.

20 Claims, 7 Drawing Sheets

(51) Int. Cl.
*B60T 8/17* (2006.01)
*B60T 8/171* (2006.01)
*B60T 8/58* (2006.01)
*B60T 8/72* (2006.01)
*B60T 13/74* (2006.01)
*B60T 17/22* (2006.01)
*G08G 1/16* (2006.01)

(56) References Cited

U.S. PATENT DOCUMENTS

2019/0366991 A1* 12/2019 Tsuchiya .................... B60T 7/12
2025/0050847 A1* 2/2025 Koh ......................... B60T 8/171

FOREIGN PATENT DOCUMENTS

| KR | 10-2015-0055852 A | 5/2015 |
| KR | 10-2015-0129110 A | 11/2015 |
| KR | 10-2017-0073746 A | 6/2017 |
| KR | 10-1843528 B1 | 5/2018 |

* cited by examiner

ANTI-COLLISION DEVICE AND ANTI-COLLISION METHOD FOR VEHICLE USING ELECTROMECHANICAL BRAKE

CROSS-REFERENCE TO RELATED APPLICATION(S)

This application claims under 35 U.S.C. § 119(a) the benefit of Korean Patent Application No. 10-2023-0104131 filed on Aug. 9, 2023 in the Korean Intellectual Property Office, the entire contents of which are incorporated herein by reference.

BACKGROUND

1. Technical Field

The present disclosure relates to an anti-collision device and anti-collision method for a vehicle, more particularly, to the anti-collision device and the anti-collision method for the vehicle when parked in neutral, utilizing an electromechanical brake (EMB).

2. Description of the Related Art

Neutral parking may refer to parking with a gear in neutral and a handbrake released so that a person who needs to move a parked vehicle may move the vehicle by applying a force from an outside of the vehicle.

When parking spaces are insufficient, a driver may neutrally park a vehicle in front or behind an already parked vehicle, and when the parked vehicle needs to move, a person may push the neutrally parked vehicle to secure space for the vehicle to move.

Meanwhile, many problems may occur while a person pushes a neutrally parked vehicle to move the vehicle.

First, as a person pushes either a front or rear of a vehicle to move the vehicle, a person may not secure sufficient visibility from the other side pushing the vehicle, and the neutrally parked vehicle may collide with surrounding structures or other parked vehicles.

In addition, a neutrally parked vehicle may not operate a separate braking device, and as a result, when a person pushes the vehicle with an excessive force or when the ground is inclined, the neutrally parked vehicle may move a longer distance than a person intended, and thus may collide with surrounding structures or other parked vehicles.

In addition, in order to prevent collisions with surrounding structures or other vehicles, there may be inconvenience in having to repeatedly perform a process of moving a vehicle and determining the surroundings thereof.

SUMMARY

The present disclosure provides an anti-collision device and anti-collision method for a vehicle (e.g., a neutrally parked vehicle) using an electromechanical brake (EMB) capable of notifying a person moving the neutrally parked vehicle of a risk of collision of the vehicle in advance of using the EMB provided in the vehicle and stopping the vehicle before a collision occurs.

According to an aspect of the present disclosure, an anti-collision device for a neutrally parked vehicle using an electromechanical brake (EMB) may include a distance detection device configured to detect a distance from a structure outside the vehicle, an EMB braking device configured to generate braking force in the vehicle, and an anti-collision control device configured to operate the EMB braking device in one of at least two anti-collision modes based on the distance detected by the distance detection device.

The at least two anti-collision modes may include a first anti-collision mode and a second anti-collision mode, and the anti-collision control device may select one of the first anti-collision mode or the second anti-collision mode based on the detected distance to operate the EMB braking device.

In the first anti-collision mode, the anti-collision control device may generate sound and vibrations using the EMB braking device.

In the second anti-collision mode, the anti-collision control device may generate the braking force using the EMB braking device.

The preset distance may include a first distance and a second distance, and the first distance may be a preset distance for operating the EMB braking device in the first anti-collision mode, the second distance may be a preset distance for operating the EMB braking device in the second anti-collision mode, and the first distance is set to be greater than the second distance.

When the detected distance is smaller than the first distance, the anti-collision control device may operate the EMB braking device in the first anti-collision mode, and when the detected distance is smaller than the second distance, the anti-collision control device may operate the EMB braking device in the second anti-collision mode.

The anti-collision device may further include a movement detection device detecting movement of the vehicle based on a wheel speed of each wheel provided in the vehicle, in which the movement detection device may detect the wheel speed of each wheel provided in the vehicle, and the anti-collision control device may supply power to the EMB braking device when the wheel speed detected through the movement detection device maintains a preset speed or more for a preset time or more.

The anti-collision device may further include a notification device including at least one of a horn or an emergency light of the vehicle, and when the EMB braking device generates the braking force, the anti-collision control device may notify an outside of the vehicle of a risk of collision with the external structure using the notification device.

The anti-collision device may further include: a torque detection device provided in a driving device of the vehicle to detect a magnitude of torque acting on the vehicle.

When the magnitude of the torque is smaller than a preset torque, the anti-collision control device may stop the vehicle for a preset time using the EMB braking device.

The EMB braking device may include: an EMB driving device receiving electricity to generate driving force; a braking force generation device receiving the driving force and moves to pressurize a brake disc and generate the braking force; and a return device generates elastic restoring force in a direction in which the braking force generation device moves away from the brake disc.

A vehicle may include the above-described anti-collision device.

According to another aspect of the present disclosure, an anti-collision method using an electromechanical brake (EMB) may include: determining whether the vehicle is neutrally parked; detecting, by a distance detection device, a distance between the vehicle and an external structure; and operating an EMB braking device based on the distance detected in the detecting of the distance between the vehicle and the external structure, in which, in the operating of the EMB braking device, the EMB braking device may be operated in one of at least two anti-collision modes selected according to the detected distance.

The determining whether the vehicle is neutrally parked may further include detecting movement of the vehicle which is performed after determining that the vehicle is neutrally parked, in the detecting of the movement of the vehicle, at least the movement detection device detecting the movement of the vehicle may be in a wake up mode, and at least the EMB braking device may be performed in a sleep mode, and the wake up mode may be a state in which power is normally supplied, while the sleep mode may be a state in which low power is supplied.

In the detecting of the movement of the vehicle, the vehicle may be detected to be moving when a wheel speed of the vehicle maintains a preset speed or more for a preset time.

The at least two anti-collision modes may include a first anti-collision mode and a second anti-collision mode, and the first anti-collision mode may generate sound and vibrations using the EMB braking device, and the second anti-collision mode may generate braking force using the EMB braking device.

In the operating of the EMB braking device, one of the first anti-collision mode or the second anti-collision mode may be selected according to a result of comparing the detected distance and a preset distance to operate the EMB braking device.

The preset distance may include a first distance and a second distance, and the first distance may be a preset distance for operating the EMB braking device in the first anti-collision mode, the second distance may be a preset distance for operating the EMB braking device in the second anti-collision mode, and the first distance may be set to be larger than the second distance.

In the operating of the EMB braking device, the EMB braking device may be operated in the first anti-collision mode when the detected distance is smaller than the first distance, and the EMB braking device may be operated in the second anti-collision mode when the detected distance is smaller than the second distance.

In the operating of the EMB braking device, when the EMB braking device generates braking force, a risk of collision of the vehicle may be notified using a notification device including at least one of a horn or an emergency light of the vehicle.

In the operating of the EMB braking device, when a torque detected by a torque detection device that detects a magnitude of the torque acting on the vehicle is detected to be smaller than a preset torque, braking force may be generated using the EMB braking device to stop the vehicle for a preset time.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure may be variously modified and have several exemplary embodiments. Therefore, specific exemplary embodiments of the present disclosure will be illustrated in the accompanying drawings and be described in detail. However, it is to be understood that the present disclosure is not limited to a specific exemplary embodiment, but includes all modifications, equivalents, and substitutions without departing from the scope and spirit of the present disclosure.

Terms used in the specification, 'first,' 'second,' etc., may be used to describe various components, but the components are not to be interpreted to be limited to the terms. The terms are used only to distinguish one component from another component. For example, a first component may be named a second component and the second component may also be similarly named the first component, without departing from the scope of the present disclosure.

Terms used in the present specification are used only in order to describe specific exemplary embodiments rather than limiting the present disclosure. Singular forms are intended to include plural forms unless the context clearly indicates otherwise.

Unless indicated otherwise, it is to be understood that all the terms used in the specification including technical and scientific terms have the same meaning as those that are generally understood by those who skilled in the art. Terms generally used and defined by a dictionary should be interpreted as having the same meanings as meanings within a context of the related art and should not be interpreted as having ideal or excessively formal meanings unless being clearly defined otherwise in the present specification.

In the present disclosure, "unit" may be implemented in various ways, for example, by a processor, program instructions executed by the processor, a software module, a microcode, a computer program product, a logic circuit, an application-specific integrated circuit, firmware, etc., or may be implemented by hardware.

Hereinafter, exemplary embodiments of the present disclosure will be described in more detail with reference to the accompanying drawings.

Figure 1:
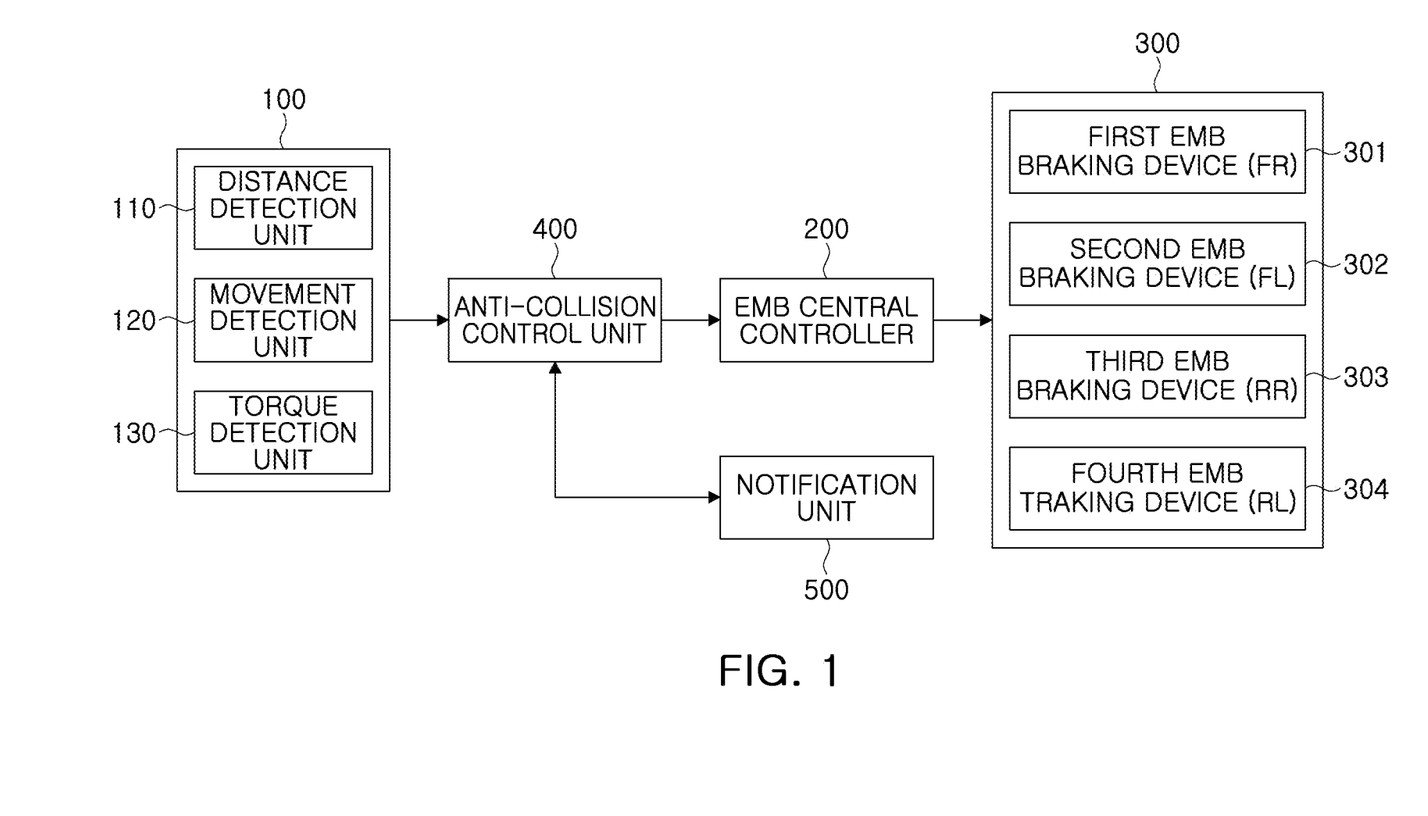
FIG. 1 is a block diagram of an anti-collision device for a neutrally parked vehicle using an electromechanical brake (EMB) according to an embodiment of the present disclosure.

FIG. 1 is a block diagram of an anti-collision device for a neutrally parked vehicle using an electromechanical brake (EMB) according to an embodiment of the present disclosure.

The anti-collision device for a neutrally parked vehicle using an electromechanical brake (EMB) according to an embodiment of the present disclosure may include a detection unit 100 including a distance detection unit 110 and a movement detection unit 120, an anti-collision control unit 400 and an EMB braking device 300.

Each of the above units may constitute modules and/or devices, which may be controllers. For example, the above units of the detection unit 100 may constitute hardware components that form part of a controller (e.g., modules or devices of a high-level controller), or may constitute individual controllers each having a processor and memory. The detection unit 100 may include one or more processors and memory.

The detection unit 100 may include the distance detection unit 110 that detects a distance from a structure outside the vehicle, and the movement detection unit 120 that detects movement of the vehicle.

The distance detection unit 110 may detect the distance from the structure outside the vehicle while a vehicle is moving. The distance detection unit 110 may be a sensor that may detect the structure outside the vehicle and measure the distance.

For example, the distance sensor 110 may include various sensors, which may measure distance, such as an ultrasonic sensor, an optical sensor, an infrared sensor, light detection and ranging (LIDAR), laser detection and ranging (LADAR), radio detection and ranging (RADAR), etc.

The movement detection unit 120 may detect the movement of the vehicle. The movement detection unit 120 may detect the movement of the vehicle using a wheel speed sensor of the vehicle.

For example, the movement detection unit 120 may monitor the speed of the wheel provided in the vehicle, and may check that the vehicle is moving when the speed of the wheel provided in the vehicle maintains a preset speed or more for a preset time or more.

The EMB braking device 300 may be configured to be mounted on an individual wheel provided in the vehicle to generate braking force. In addition, the EMB braking device 300 may generate sound and vibrations in the vehicle.

Figure 2:
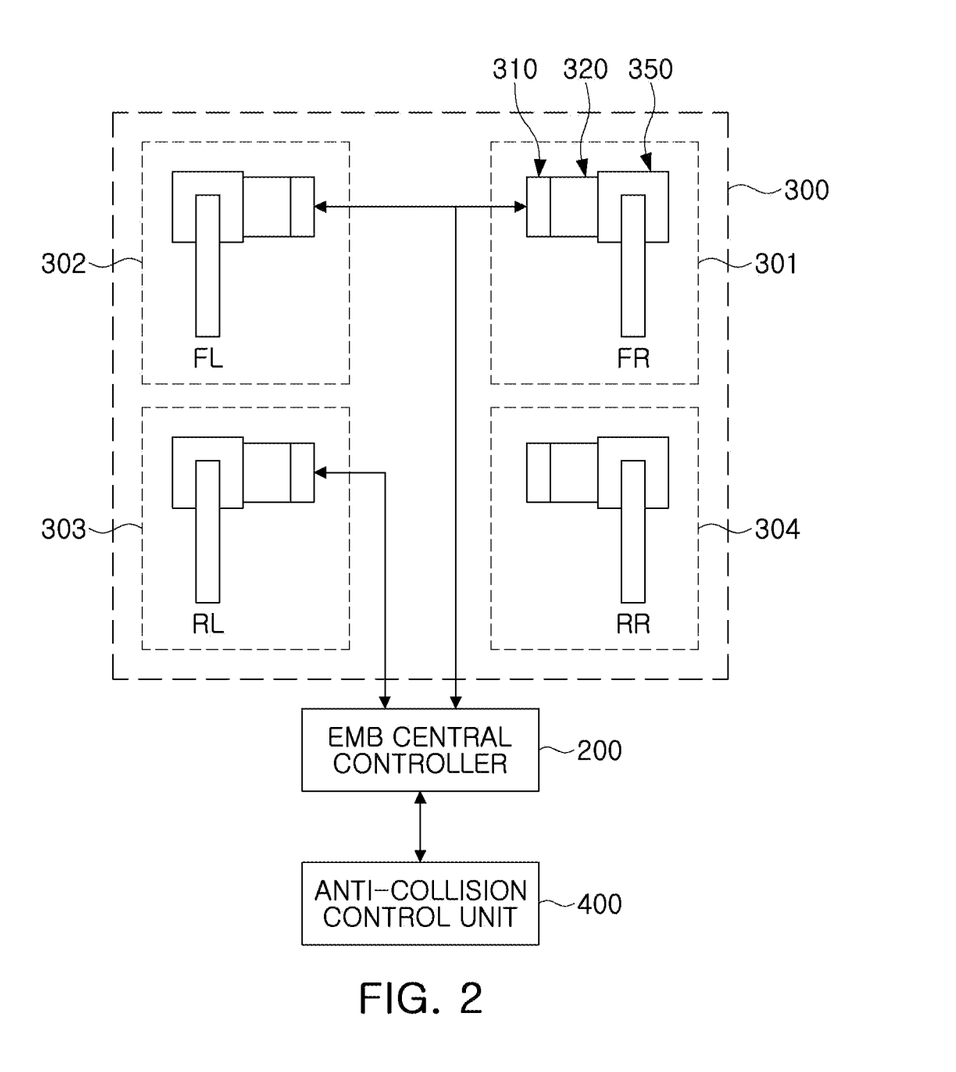
FIG. 2 is a diagram illustrating an EMB braking system provided in a vehicle according to an embodiment of the present disclosure.
Figure 3A:
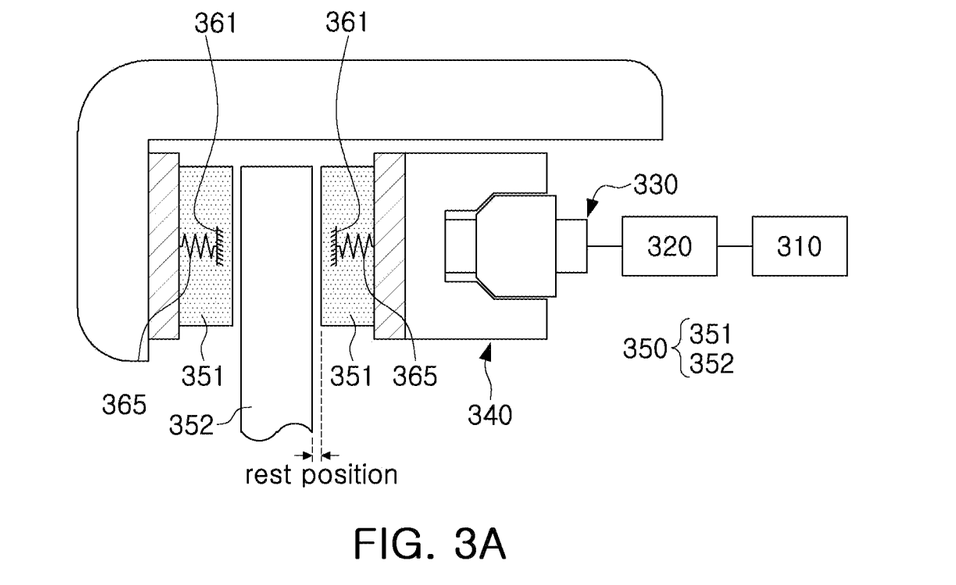
FIG. 3A is an exemplary diagram illustrating an operation of an EMB braking device in a second anti-collision mode according to an embodiment of the present disclosure.
Figure 3B:
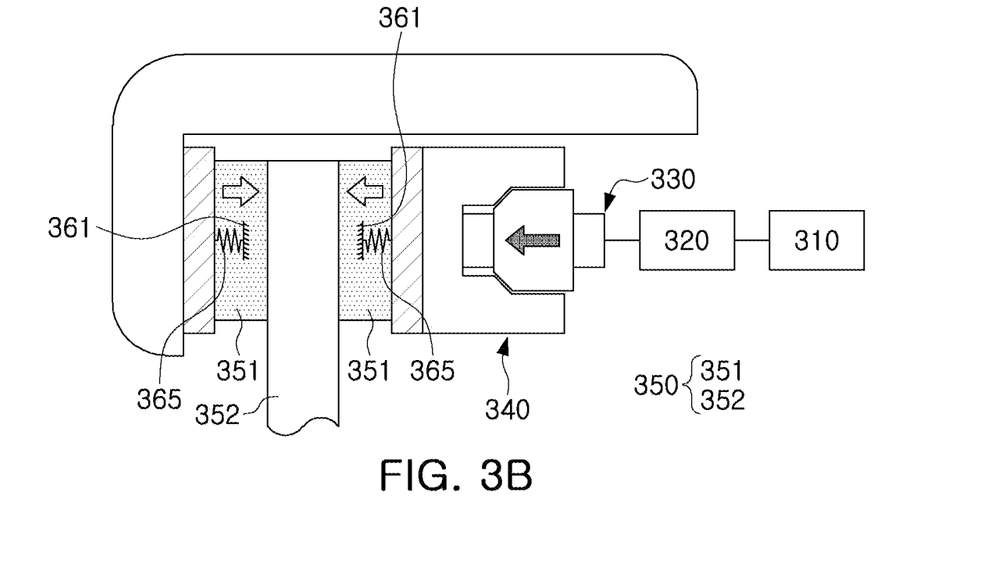
FIG. 3B is an exemplary diagram illustrating the operation of the EMB braking device in the second anti-collision mode according to the embodiment of the present disclosure.
Figure 4A:
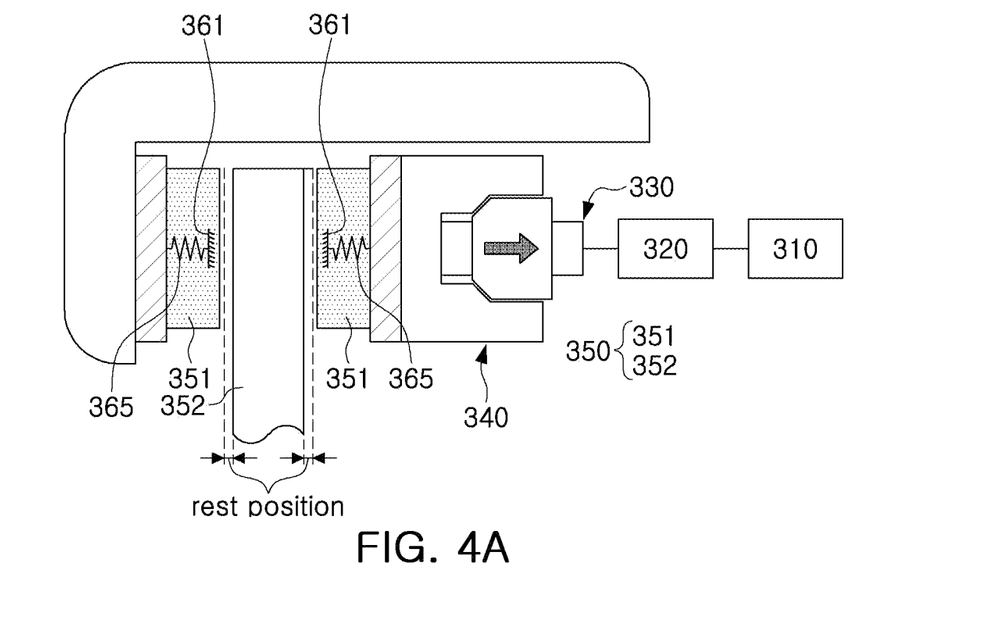
FIG. 4A is an exemplary diagram illustrating an operation of the EMB braking device in a first anti-collision mode according to an embodiment of the present disclosure.
Figure 4B:
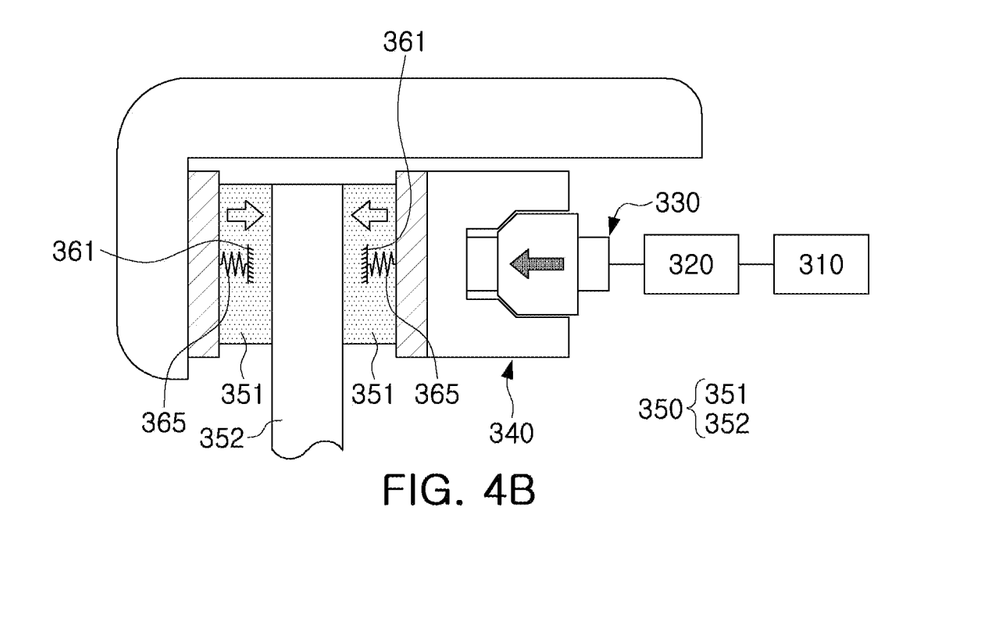
FIG. 4B is an exemplary diagram illustrating the operation of the EMB braking device in the first anti-collision mode according to the embodiment of the present disclosure.

FIG. 2 is a diagram illustrating an EMB braking system provided in a vehicle according to an embodiment of the present disclosure, FIGS. 3A and 3B are exemplary diagrams illustrating an operation of the EMB braking device 300 in a second anti-collision mode according to an embodiment of the present disclosure, and FIGS. 4A and 4B are exemplary diagrams illustrating an operation of the EMB braking device 300 in a first anti-collision mode according to an embodiment of the present disclosure.

Referring to FIG. 2, the EMB braking device 300 may be provided on each wheel mounted on a vehicle. Hereinafter, it will be described as including first to fourth EMB braking devices 301, 302, 303, and 304 based on a vehicle provided with four wheels, but is not limited thereto, and the number of EMB braking devices 300 may vary depending on the number of wheels and the EMB braking system that are provided in the vehicle.

The anti-collision control unit 400, which will be described later, may be connected to the first to fourth EMB braking devices 301, 302, 303, and 304, respectively, and may control the first to fourth EMB braking devices 301, 302, 303, and 304.

Meanwhile, the first to fourth EMB braking devices 301, 302, 303, and 304 may include an EMB central controller 200, and the EMB central controller 200 may be connected to EMB controllers 310 individually provided in the first to fourth EMB braking devices 301, 302, 303, and 304 to individually control the first to fourth EMB braking devices 301, 302, 303, and 304.

In addition, the anti-collision control unit 400 may be connected to the EMB central controller 200 to generate braking force in the first to fourth EMB braking devices 301, 302, 303, and 304 or to generate sound and vibrations.

Here, the EMB central controller 200 may determine the braking force to be generated by each EMB based on information such as a pedal stroke amount, a wheel speed, a longitudinal acceleration, and a yaw of a vehicle while the vehicle is traveling.

Referring to FIGS. 2, 3A, 3B, 4A, and 4B, the EMB braking device 300 may include an EMB controller 310, an EMB driving unit 320, a power transmission unit 330, a power conversion unit 340, and a braking force generation unit 350.

The EMB controller 310 may control the EMB driving unit 320 through a collision occurrence control unit or the EMB central controller 200 to generate the braking force or sound and vibrations from the EMB braking device.

The EMB driving unit 320 may provide driving force that may generate the braking force in the braking force generation unit 350. The EMB driving unit 320 may be an actuator that receives electricity and generates the driving force. The EMB driving unit 320 may generate the driving force by rotational motion generated from the actuator.

The power transmission unit 330 may receive the driving force generated by the rotational motion of the EMB driving unit 320. The power transmission unit 330 may include a spindle and may be connected to the EMB driving unit 320 to receive rotational energy from the EMB driving unit.

The power conversion unit 340 may convert the driving force of the rotational motion received by the power transmission unit 330 into linear motion.

For example, the power conversion unit 340 may be a ball screw. When the driving force of the rotational motion received from the power transmission unit 330 rotates the screw, the ball may move linearly along the screw.

Alternatively, the power conversion unit 340 may include a bolt that rotates integrally with the spindle, a nut that moves forward and backward according to a rotation of the bolt, and a piston that includes the nut inside and moves together with the nut.

One end of the power conversion unit 340 may be connected to the power transmission unit 330 that transmits the driving force of the rotational motion, and the other end thereof may be connected to the braking force generation unit 350.

The braking force generation unit 350 may be connected to the power conversion unit 340 and move linearly, and may press a brake disk 352 to generate the braking force.

For example, the braking force generation unit 350 may include at least one brake pad 351. In addition, the braking force generation unit 350 may be two brake pads 351 arranged opposite to each other with the brake disc 352 interposed therebetween.

In other words, the EMB driving unit 320 may generate rotational motion energy based on the EMB controller 310, and the power transmission unit 330 receives the rotational motion energy of the EMB driving unit 320 and transmits the received rotational motion energy to the power conversion unit 340. The power conversion unit 340 may convert the rotational motion energy of the EMB driving unit 320 received from the power transmission unit 330 into the linear motion energy. The braking force generation unit 350 may move according to the converted linear motion energy and press the brake disk 352 to generate the braking force.

The EMB braking device 300 according to an embodiment of the present disclosure may further include a return unit 360. The return unit 360 may be configured to reduce a contact drag between the braking force generation unit 350 and the brake disc 352 when braking is completed.

The return unit 360 may help the braking force generation unit 350 to stably fall together with the power conversion unit 340 from the brake disc 352 when the pressing of the brake disc 352 by the braking force generation unit 350 is completed.

Figure 5:
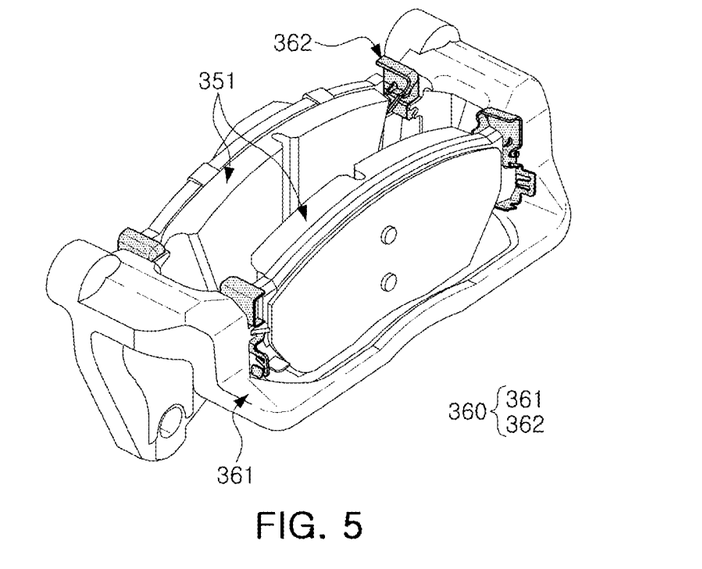
FIG. 5 is a perspective view of a return unit of the EMB braking device according to the embodiment of the present disclosure.
Figure 6:
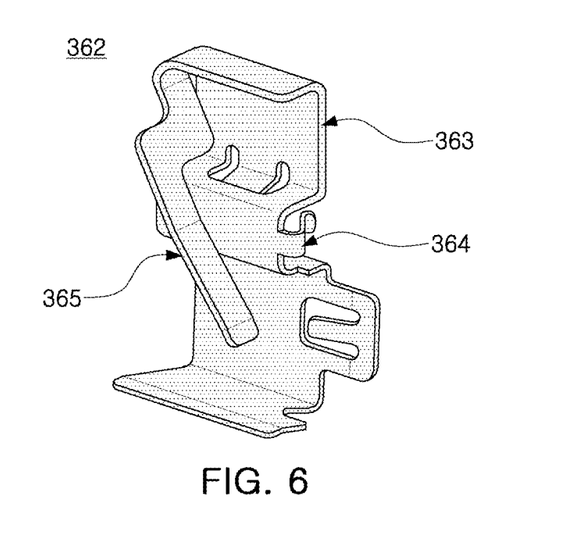
FIG. 6 is a perspective view of a pad liner according to an embodiment of the present disclosure.

FIG. 5 is a perspective view of the return unit 360 of the EMB braking device according to the embodiment of the present disclosure, and FIG. 6 is a perspective view of a pad liner 362 according to an embodiment of the present disclosure.

Referring to FIGS. 5 and 6, the return unit 360 according to the embodiment of the present disclosure will be described in more detail.

Referring to FIG. 5, the return unit 360 according to the embodiment of the present disclosure includes a torque member 361 that is fixedly supported on a vehicle body by combining with a knuckle (not illustrated), and the pad liner 362 that is arranged between the torque member 361 and a brake pad 351 and is fixedly supported on the torque member 361.

In addition, referring to FIG. 6, the pad liner 362 may include a body part 363 coupled to the torque member 361, a guide part 364 protruding from the body part 363 and is inserted into a portion of the brake pad 351 to form a movement path of the brake pad 351, and an elastic force generation unit 365 generating elastic restoring force in a direction away from the brake disc 352 based on the movement of the brake pad 351.

The elastic force generation unit 365 may be formed to protrude from the body part 363 in the direction of the brake pad 351 and may be in inclined contact with one surface of the brake pad 351 so that the brake pad 351 may move away from the brake disc 352.

The elastic force generation unit 365 may be made of an elastic material and may generate elastic restoring force in the direction of the brake pad 351 from the body part 363.

When the braking is completed, the brake pad 351 is separated from the brake disc 352 and returned to its original position due to the elastic force generation unit 365, and the drag phenomenon that occurs when the brake pad 351 comes into contact with the brake disc 352 may be prevented.

The operation of the elastic force generation unit 365 will be described in more detail.

When the braking force occurs, the brake pad 351 may move toward the brake disc 352 by the driving force generated by the EMB driving unit 320, and press the brake disc 352 to generate the braking force.

Here, one side is in contact with one surface of the brake pad 351, and the return unit 360, which is fixed to the torque member 361, may be deformed as the brake pad 351 moves to the brake disc 352 and generate the elastic restoring force.

Accordingly, when the braking is completed and the driving force generated by the EMB driving unit 320 applied to the brake pad 351 is removed, the brake pad 351 may move in a direction away from the brake disc 352 according to the elastic restoring force of the return unit 360.

Referring back to FIGS. 3A and 3B, the process of generating sound and vibrations using the EMB braking device 300 will be described.

Referring to FIGS. 3A to 3B, in a normal operating state, the EMB braking device 300 may space the distance between the braking force generation unit 350 and the brake disk 352 by a rest position by taking into account braking reactivity, drag generation, and the like.

The EMB braking device 300 may directly detect the distance between the braking force generation unit 350 and the brake disk 352 to adjust the distance between the braking force generation unit 350 and the brake disk 352. Alternatively, the EMB braking device 300 may control the rotation of the motor included in the EMB driving unit 320 using a motor position sensor to adjust the distance between the braking force generation unit 350 and the brake disk 352.

Referring to FIGS. 4A and 4B, in the case of generating sound and vibrations using the EMB braking device 300, the EMB braking device 300 may space the distance between the braking force generation unit 350 and the brake disk 352 to the rest position or more.

In addition, the EMB braking device 300 may maximize the forward speed of the braking force generation unit 350 by adjusting the current value applied to the EMB driving unit 320, and the braking force generation unit 350 may contact the brake disc 352 to generate impact sound and vibrations.

In particular, in the state in which the distance between the braking force generation unit 350 and the brake disc 352 are spaced apart from each other to the rest position or more, the EMB braking device 300 may generate larger impact sound and vibrations by rapidly moving the braking force generation unit 350.

When the conditions for generating sound and vibrations using the EMB braking device 300 are terminated, the EMB braking device 300 may position the braking force generation unit 350 to be spaced apart from the brake disk 352 by a preset rest position.

The anti-collision control unit 400 may control the EMB braking device 300 based on the distance from a structure outside the vehicle and the movement of the vehicle. In particular, the anti-collision control unit 400 may control the EMB braking device 300 in two anti-collision modes based on the distance from the structure outside the vehicle and the movement of the vehicle.

Here, one of the two anti-collision modes included in the anti-collision control unit 400 will be referred to as a first anti-collision mode, and the other anti-collision mode will be referred to as a second anti-collision mode.

In the first anti-collision mode, the anti-collision control unit 400 may control sound and vibrations to be generated from the EMB braking device 300. In addition, in the second anti-collision mode, the anti-collision control unit 400 may control the braking force to be generated from the EMB braking device 300.

The anti-collision control unit 400 may select the first anti-collision mode or the second anti-collision mode based on the distance between the vehicle and the external structure detected by the distance detection unit 110 to control the EMB braking device 300.

The anti-collision control unit 400 may set and store a first distance and a second distance in advance.

Here, the first distance may be a distance for starting the first anti-collision mode, and the second distance may be a distance for starting the second anti-collision mode.

More specifically, the anti-collision control unit 400 may control the EMB braking device 300 in the first anti-collision mode when the detected distance between the external structure and the vehicle is smaller than the first distance. The anti-collision control unit 400 may control the EMB braking device 300 in the second anti-collision mode when the detected distance between the external structure and the vehicle is smaller than the second distance.

That is, when the detected distance between the external structure and the vehicle is smaller than the first distance, the anti-collision control unit 400 may generate sound and vibrations using the EMB braking device 300 to notify a person moving a vehicle, which is neutrally parking, of a risk of collision.

In addition, when the detected distance between the external structure and the vehicle is smaller than the second distance, the anti-collision control unit 400 may generate the braking force using the EMB braking device 300 to stop the vehicle, thereby preventing the vehicle from colliding with the external structure.

In addition, the anti-collision control unit 400 may determine whether to supply power to the EMB braking device 300 based on the movement detection unit 120 that detects the movement of the vehicle based on the speed of each wheel provided in the vehicle.

Continuous power supply to a neutrally parked vehicle may cause problems such as battery discharge. Therefore, it is preferable that a minimum amount of power is used for a vehicle which is parking.

The anti-collision control unit 400 may be in a sleep mode where only the movement detection unit 120 supplies normal power while the vehicle is neutrally parking, and the remaining components are deactivated to provide minimum power.

When the movement of the vehicle is detected, the anti-collision control unit 400 can switch to a wake up mode in which all components of the anti-collision device are activated to supply normal power.

The anti-collision device according to the embodiment of the present disclosure may further include a notification unit 500.

The notification unit 500 may be configured to generate a notification outside the vehicle. For example, the notification unit 500 may include a horn or an emergency light of a vehicle.

An anti-collision device for a neutrally parked vehicle using an EMB according to an embodiment of the present disclosure may generate the sound and vibrations or generate the braking force using the EMB braking device 300. That is, the anti-collision device according to the embodiment of the present disclosure may not generate the sound and vibrations using the EMB braking device 300 when the braking force is generated using the EMB braking device 300.

Accordingly, when generating the braking force using the EMB braking device 300, the anti-collision device according to an embodiment of the present disclosure may sound the horn or repeatedly flash the emergency light through the notification unit 500 to additionally notify a person pushing the neutrally parked vehicle of the risk of collision.

The anti-collision device according to an embodiment of the present disclosure may further include a torque detection unit 130.

The torque detection unit 130 may be a torque sensor mounted on a vehicle. The torque detection unit 130 may check a force with which a person pushes a neutrally parked vehicle from the outside, that is, the magnitude of the external force acting on the vehicle.

The anti-collision control unit 400 may control the EMB braking device 300 based on the magnitude of the external force detected by the torque detection unit 130.

More specifically, when moving the neutrally parked vehicle, there may be cases where the vehicle continues to move due to inertia even when the external force acting on the vehicle is removed.

The anti-collision control unit 400 may generate the braking force using the EMB braking device 300 when the external force detected by the torque detection unit 130 falls below a preset amount. Here, a preset magnitude of torque compared to the torque value detected by the torque detection unit 130 may be referred to as a reference torque.

The anti-collision control unit 400 may compare the torque value of the torque detection unit 130 with a reference torque value and when the torque value of the torque detection unit 130 becomes smaller than the reference torque value, generate the braking force using the EMB braking device 300 to stop the vehicle for a preset time.

By allowing the neutral vehicle to move again after stopping only for the preset time, it is possible to prevent the vehicle from colliding with the external structure due to the additional movement of the vehicle by inertia while the external force acting on the neutrally parked vehicle is removed.

The components of the anti-collision device according to an embodiment of the present disclosure may be connected wired and wirelessly to exchange information. For example, data may be received and transmitted using communication means such as Ethernet, media oriented systems transport (MOST), Flexray, a controller area network (CAN), a local interconnect network (LIN), Internet, LTE, 5G, Wi-Fi, 5G, Wi-Fi, Bluetooth, near field communication (NFC), Zigbee, and radio frequency.

Figure 7:
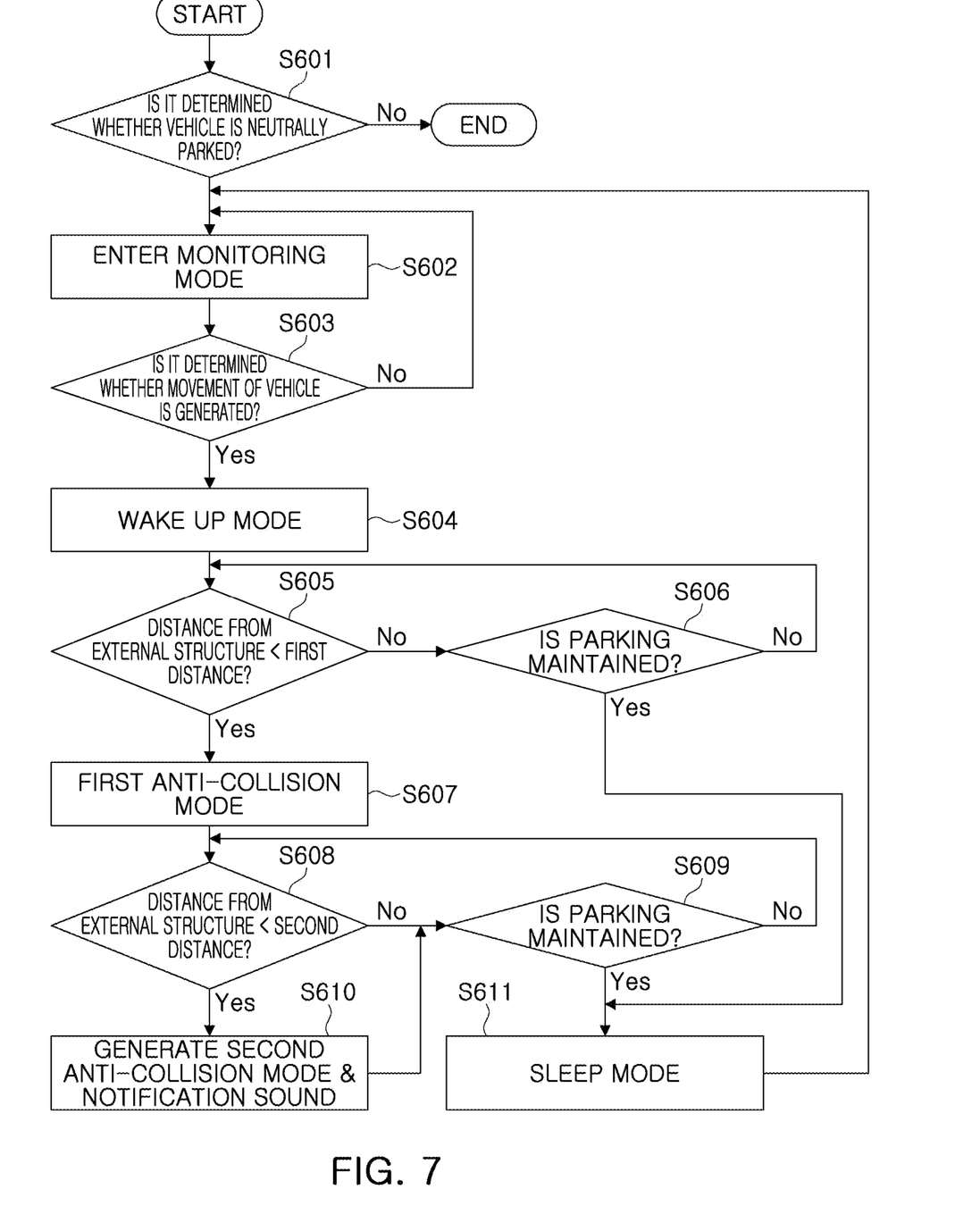
FIG. 7 is a flowchart of an anti-collision method of a neutrally parked vehicle using an electromechanical brake (EMB) according to an embodiment of the present disclosure.

FIG. 7 is a flowchart of an anti-collision method of a neutrally parked vehicle using an electromechanical brake (EMB) according to an embodiment of the present disclosure.

Referring to FIG. 7, the anti-collision method according to an embodiment of the present disclosure may determine whether the vehicle is neutrally parked.

Whether the vehicle is neutrally parked may be determined based on whether the vehicle's engine is turned off and whether the vehicle is in neutral gear (S601).

When it is determined that the vehicle is in a neutrally parked state, the anti-collision method according to an embodiment of the present disclosure may enter a monitoring mode (602).

In the monitoring mode, in order to prevent power consumption in a vehicle which is parking, the anti-collision control unit 400 only monitors the wheel speed to detect the movement of the vehicle, and the remaining components are deactivated to be in a sleep mode that the minimum power is consumed.

When the monitoring mode is initiated, the anti-collision method according to an embodiment of the present disclosure may detect the movement of the vehicle using the movement detection unit 120 (S603).

More specifically, the movement detection unit 120 may transmit the wheel speed of each wheel provided in the vehicle to the anti-collision control unit 400 when the vehicle moves. The anti-collision control unit 400 may determine that the vehicle is moving when the wheel speed of at least one of the wheels provided in the vehicle remains above the preset wheel speed for a preset time.

If it is determined that the vehicle is moving, the anti-collision control unit 400 may switch the components of the anti-collision device in the sleep mode to the wake up mode (S604).

The anti-collision method may detect a distance between the external structure and the vehicle using the distance detection unit 110.

The anti-collision control unit 400 may compare the distance detected by the distance detection unit 110 with the preset first distance and second distance. Here, the first distance may be a distance for starting the first anti-collision mode, and the second distance may be a distance for starting the second anti-collision mode.

The anti-collision control unit 400 may compare the distance detected by the distance detection unit 110 with the preset first distance (S605).

When the detected distance between the external structure and the vehicle is smaller than the first distance, the anti-collision control unit 400 may control the EMB braking device 300 in the first anti-collision mode to directly notify the outside of the risk of collision (S607).

Here, the first anti-collision mode may be a mode generating sound and vibrations using the EMB braking device 300.

More specifically, in the first anti-collision mode, for stable braking, the braking force generation unit 350, which is located in a rest position by being spaced a predetermined distance from the brake disc 352, may be spaced further apart.

In addition, the EMB braking device 300 may adjust the current value applied to the EMB driving unit 320 to maximize the forward speed of the braking force generation unit 350.

Accordingly, the brake disc 352 and the braking force generation unit 350 that are far away collide with each other, so the impact sound and vibrations may occur.

The anti-collision method according to an embodiment of the present disclosure generates vibration in the vehicle to notify the risk of collision, thereby more directly and intuitively notify a person applying an external force of the risk of collision by contacting a part of the body with the vehicle.

When the detected distance between the external structure and the vehicle is larger than the first distance, the anti-collision control unit 400 may check whether the movement of the vehicle stops and the vehicle is in a stopped state for a preset time (S606).

When the vehicle is stopped for the preset time, it may be considered that the movement of the neutrally parked vehicle is completed. In this case, the anti-collision method according to an embodiment of the present disclosure may again return to the monitoring mode to minimize power consumption and wait for the next movement (S611).

The anti-collision control unit 400 may compare the distance detected by the distance detection unit 110 with the preset second distance (S608).

When the detected distance between the external structure and the vehicle is smaller than the second distance, the anti-collision control unit 400 may control the EMB braking device 300 in the second anti-collision mode to generate the braking force and stop the vehicle, thereby preventing the vehicle from colliding with the external structure (S609).

Here, the anti-collision control unit 400 can notify the person moving the vehicle by applying external force of the risk of collision of the vehicle through the notification unit 500 that includes a horn or emergency light.

The method of preventing collision according to an embodiment of the present disclosure may notify the risk of collision or generate the braking force using the EMB braking device 300 based on the distance between the external structure and the vehicle. That is, the anti-collision method according to an embodiment of the invention performs two functions with the EMB braking device 300.

Therefore, since the anti-collision method according to an embodiment of the invention may make it difficult to notify the outside of the risk of collision when the EMB braking device 300 is generating the braking force, the anti-collision method may notify the outside of the risk of collision using the additional notification unit 500.

When the detected distance between the external structure and the vehicle is larger than the second distance or the second anti-collision mode is performed, the anti-collision control unit 400 may check whether the movement of the vehicle stops and the vehicle is in the stopped state for a preset time (S609).

When the vehicle is stopped for the preset time, it may be considered that the movement of the neutrally parked vehicle is completed. In this case, the anti-collision method according to an embodiment of the present disclosure may again return to the monitoring mode to minimize power consumption and wait for the next movement (S611).

Figure 8:
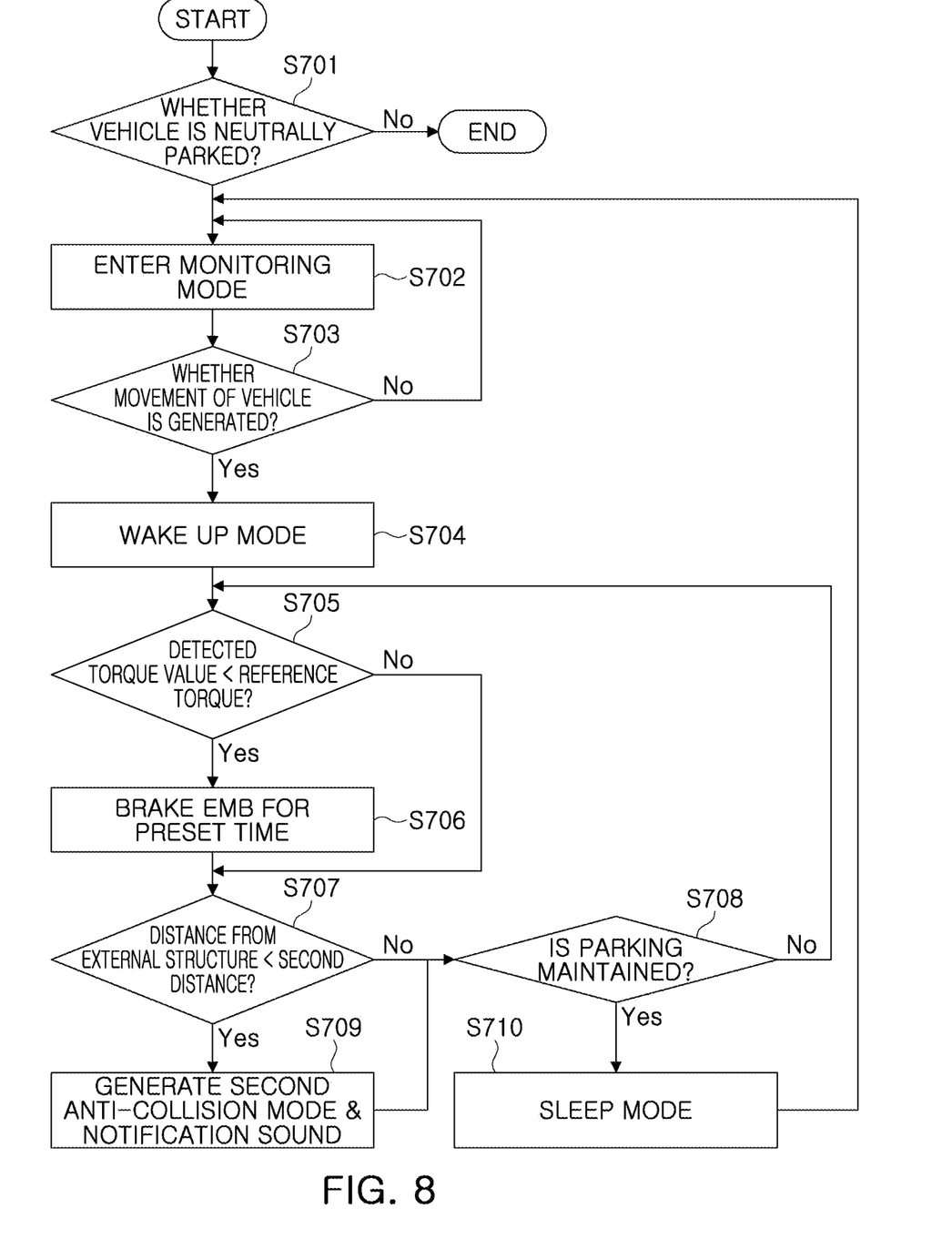
FIG. 8 is a flowchart of an anti-collision method of a neutrally parked vehicle using an electromechanical brake (EMB) according to another embodiment of the present disclosure.

FIG. 8 is a flowchart of an anti-collision method of a neutrally parked vehicle using an electromechanical brake (EMB) according to another embodiment of the present disclosure.

The embodiment of FIG. 8 may be an embodiment in which the torque detection unit 130 is further included in the embodiment of FIG. 7 to prevent the inertial movement of the vehicle. S701 to S704 and S707 to S710 in FIG. 8 correspond to S601 to S604 and S608 to S611 in FIG. 7, respectively, and repeated descriptions thereof will be omitted.

Referring to FIG. 8, the anti-collision method according to another embodiment of the present disclosure may compare the torque value detected by the torque detection unit 130 with the preset reference torque value (S705).

The anti-collision control unit 400 may compare the torque value of the torque detection unit 130 with the reference torque value and when the torque value of the torque detection unit 130 becomes smaller than the reference torque value, generate the braking force for the preset time using the EMB braking device 300 (S706).

Through this, it is possible to prevent the vehicle from colliding with the external structure due to the additional movement of the vehicle by inertia while the external force acting on the neutrally parked vehicle is removed.

In addition, when the detected distance between the external structure and the vehicle is larger than the second distance or the second anti-collision mode is performed, the anti-collision control unit 400 may check whether the movement of the vehicle stops and the vehicle is in a stopped state for the preset time (S708).

When the vehicle does not stop for the preset time, step S705 is performed again to prevent a collision due to the movement by inertia while the neutrally parked vehicle is moving.

Meanwhile, in FIG. 8, only the flowchart related to the method for preventing inertial movement (S705 and S706) and the second anti-collision mode (S707 to S710) are illustrated, but it is not limited thereto, and the method of preventing inertial movement may be performed with the first anti-collision mode and the second anti-collision mode.

For example, steps S705 and S706 of FIG. 8 may be performed between steps S604 and S605 of FIG. 7 and between steps S607 and S608, respectively.

As set forth above, according to an anti-collision device and anti-collision method for a neutrally parked vehicle using an electromechanical brake (EMB) according to an embodiment of the present disclosure, it is possible to notify a person moving the neutrally parked vehicle of a risk of collision of the vehicle in advance using the EMB provided in the vehicle and stop the vehicle before a collision occurs.

In addition, according to the anti-collision device and anti-collision method for a neutrally parked vehicle using an electromechanical brake (EMB), by using the EMB provided in the vehicle to generate vibration as well as sound, it is possible to more directly notify a person pushing the neutrally parked vehicle of the risk of collision.

In addition, an anti-collision device and anti-collision method for a neutrally parked vehicle using an electromechanical brake (EMB) according to another embodiment of the present disclosure, by generating braking force based on a magnitude of external force acting on the vehicle, it is possible to prevent the vehicle moving due to inertia from colliding with external structures.

The methods according to the present disclosure may be implemented in a form of program commands that may be executed through various computer means and may be recorded in a computer-readable recording medium. The computer-readable recording medium may include a program command, a data file, a data structure, or the like, alone or a combination thereof. The program commands recorded in the computer-readable recording medium may be especially designed and constituted for the present disclosure or be known to those skilled in a field of computer software.

Examples of the computer-readable medium may include hardware devices specially configured to store and execute program instructions, such as ROM, RAM, flash memory, and the like. Examples of the program commands include a high-level language code capable of being executed by a computer using an interpreter, or the like, as well as a machine language code made by a compiler. The above-described hardware device may be constituted to be operated as one or more software modules in order to perform an operation according to the present disclosure, and vice versa.

As set forth above, according to an anti-collision device and anti-collision method for a neutrally parked vehicle using an electromechanical brake (EMB) according to an embodiment of the present disclosure, it is possible to notify a person moving the neutrally parked vehicle of a risk of collision of the vehicle in advance using the EMB provided in the vehicle and stop the vehicle before a collision occurs.

In addition, according to the anti-collision device and anti-collision method for a neutrally parked vehicle using an electromechanical brake (EMB), by using the EMB provided in the vehicle to generate vibration as well as sound, it is possible to more directly notify a person pushing the neutrally parked vehicle of the risk of collision.

In addition, an anti-collision device and anti-collision method for a neutrally parked vehicle using an electromechanical brake (EMB) according to another embodiment of the present disclosure, by generating braking force based on a magnitude of external force acting on the vehicle, it is possible to prevent the vehicle moving due to inertia from colliding with external structures.

Although the embodiments of the present disclosure have been disclosed hereinabove, it may be understood by those skilled in the art that the present disclosure may be variously modified and altered without departing from the scope and spirit of the present disclosure described in the following claims.

What is claimed is:

1. An anti-collision device for a vehicle using an electromechanical brake (EMB), comprising:
   a distance detection device configured to detect a distance from a structure outside the vehicle;
   an EMB braking device configured to generate braking force in the vehicle; and
   an anti-collision controller comprising a processor and a memory, the processor configured to operate the EMB braking device in one of at least two anti-collision modes based on the distance detected by the distance detection device.

2. The anti-collision device of claim 1, wherein the at least two anti-collision modes include a first anti-collision mode and a second anti-collision mode, and
   the processor is configured to select one of the first anti-collision mode or the second anti-collision mode according to a result of comparing the detected distance and a preset distance to operate the EMB braking device.

3. The anti-collision device of claim 2, wherein in the first anti-collision mode, the processor generates sound and vibrations using the EMB braking device.

4. The anti-collision device of claim 2, wherein in the second anti-collision mode, the processor generates the braking force using the EMB braking device.

5. The anti-collision device of claim 2, wherein the preset distance includes a first distance and a second distance, and
the first distance is a preset distance for operating the EMB braking device in the first anti-collision mode, the second distance is a preset distance for operating the EMB braking device in the second anti-collision mode, and the first distance is set to be larger than the second distance.

6. The anti-collision device of claim 5, wherein when the detected distance is smaller than the first distance, the processor operates the EMB braking device in the first anti-collision mode, and
when the detected distance is smaller than the second distance, the processor operates the EMB braking device in the second anti-collision mode.

7. The anti-collision device of claim 1, further comprising:
a movement detection device configured to detect movement of the vehicle based on a wheel speed of each wheel provided in the vehicle,
wherein the movement detection device detects the wheel speed of each wheel provided in the vehicle, and
the processor supplies power to the EMB braking device when the wheel speed detected through the movement detection device maintains a preset speed or more for a preset time or more.

8. The anti-collision device of claim 1, further comprising:
a notification device including at least one of a horn or an emergency light of the vehicle, and
when the EMB braking device generates the braking force, the processor notifies the outside of the vehicle of a risk of collision with the external structure using the notification device.

9. The anti-collision device of claim 1, further comprising:
a torque detection device provided in a driving device of the vehicle to detect a magnitude of torque acting on the vehicle,
wherein when the magnitude of the torque is smaller than a preset torque, the processor stops the vehicle for a preset time using the EMB braking device.

10. The anti-collision device of claim 1, wherein the EMB braking device includes:
a braking force generation device configured to receive a driving force and pressurize a brake disc and generate the braking force; and
a return device configured to generate elastic restoring force in a direction in which the braking force generation device moves away from the brake disc.

11. A vehicle comprising the anti-collision device of claim 1.

12. An anti-collision method of a vehicle using an electromechanical brake (EMB), the anti-collision method comprising:
determining whether the vehicle is neutrally parked;
detecting, by a distance detection device, a distance between the vehicle and an external structure; and
operating an EMB braking device based on the distance detected in the detecting of the distance between the vehicle and the external structure,
wherein the EMB braking device is configured to operate in one of at least two anti-collision modes selected according to the detected distance.

13. The anti-collision method of claim 12, wherein determining whether the vehicle is neutrally parked further includes detecting movement of the vehicle which is performed after determining that the vehicle is neutrally parked,
in detecting the movement of the vehicle, at least a movement detection device detecting the movement of the vehicle is in a wake up mode, and at least the EMB braking device is performed in a sleep mode, and
the wake up mode is a state in which power is normally supplied, and the sleep mode is a state in which low power is supplied.

14. The anti-collision method of claim 13, wherein in detecting the movement of the vehicle, the vehicle is detected to be moving when a wheel speed of the vehicle maintains a preset speed or more for a preset time.

15. The anti-collision method of claim 12, wherein the at least two anti-collision modes include a first anti-collision mode and a second anti-collision mode,
the first anti-collision mode is configured to generate sound and vibrations using the EMB braking device, and
the second anti-collision mode is configured to generate braking force using the EMB braking device.

16. The anti-collision method of claim 15, wherein in operating the EMB braking device, one of the first anti-collision mode or the second anti-collision mode is selected according to a result of comparing the detected distance and a preset distance to operate the EMB braking device.

17. The anti-collision method of claim 16, wherein the preset distance includes a first distance and a second distance, and
the first distance is a preset distance for operating the EMB braking device in the first anti-collision mode, the second distance is a preset distance for operating the EMB braking device in the second anti-collision mode, and the first distance is set to be larger than the second distance.

18. The anti-collision method of claim 17, wherein in operating the EMB braking device, the EMB braking device is operated in the first anti-collision mode when the detected distance is smaller than the first distance, and the EMB braking device is operated in the second anti-collision mode when the detected distance is smaller than the second distance.

19. The anti-collision method of claim 12, wherein in operating the EMB braking device, when the EMB braking device generates braking force, a risk of collision of the vehicle is notified using a notification device including at least one of a horn or an emergency light of the vehicle.

20. The anti-collision method of claim 12, wherein in operating the EMB braking device, when a torque detected by a torque detection device that detects a magnitude of the torque acting on the vehicle is detected to be smaller than a preset torque, braking force is generated using the EMB braking device to stop the vehicle for a preset time.

* * * * *